Patented June 15, 1937

2,084,263

UNITED STATES PATENT OFFICE 2,084,263

PRODUCTS BONDED WITH THE RESINOUS REACTION PRODUCTS FROM POLYHYDRIC ALCOHOLS AND PHOSPHORIC ACID COMPOUND

Willis A. Boughton, Cambridge, and William R. Mansfield, Boston, Mass., assignors to New England Mica Co., Waltham, Mass., a corporation of Massachusetts No Drawing. Original application September 25, 1934, Serial No. 745,488. Divided and this application April 9, 1935, Serial No. 15,423

17 Claims. (Cl. 154—2.6)

This invention relates to products composed of discrete particles, useful in the arts, said particles being bonded with resin-like compounds made from polyhydric alcohols and certain phosphoric acid compounds, this application being a division from our co-pending application for Resinous reaction products from polyhydric alcohols and phosphoric acid compounds, Serial Number 745,488, filed September 25, 1934.

An object of the invention is to provide products made of discrete particles of matter bonded together with a new type of binder, the products being capable of withstanding wide temperature changes, ranging from ordinary temperatures to those approaching a red heat, without loss of integration or impairment of other useful properties.

A further object is to provide laminated mica products, for example sheets, bound with a new type of colloidal binder possessing the advantages of the well known low-temperature organic binders and also the high temperature inorganic binders, the products maintaining continuous integration over wide ranges of temperature, from ordinary temperatures up to that of thermal disintegration of the mica.

A further object is to provide laminated mica products having new and useful properties over increased temperature ranges, which new properties result from the employment of new types of colloidal organic-inorganic compounds as binders, as described herein.

A further object is to provide laminated mica products, which when in the form of sheets, may originally possess flexibility at ordinary temperatures, and after heating retain to a large degree their bonded strength, even when heated to the decomposition temperature of mica, but which after having been heated to high temperatures lose their original flexibility upon cooling to ordinary temperatures, becoming rigid when cooled, in any desired formed shape.

A further object is to provide a mica product, for example a sheet, which at normal temperatures shall have a dielectric strength sufficient for all commercial purposes, and at higher temperatures shall possess minima of dielectric strength sufficient for all commercial purposes and also retain its integration and good mechanical properties after cooling.

A further object is to provide a laminated mica product, for example a sheet, that maintains integration and high dielectric strength at all temperatures under all conditions of service up to the point of decomposition of the mica.

Other objects of the invention will be apparent to those skilled in the art upon reading the specification.

As heretofore disclosed in the following—

Boughton, patent, 1,975,078; Oct. 2. 1934;
Boughton, patent, 1,975,079; Oct. 2, 1934;
Boughton and Mansfield, patent 1,975,080; Oct. 2, 1934;
Boughton, patent 2,004,030, June 4, 1935.

compounds of certain phosphoric acids, such as sodium metaphosphate, are of great value in the compounding of inorganic adhesives, particularly in the manufacture of laminated mica products, because of the colloidal viscous nature of their aqueous solutions and the glass-like condition of their fused forms.

In a search for new and advantageous binders for mica pieces or scales in the manufacture of laminated mica products, it has been discovered that resinous adhesives formed by reaction of phosphoric acid radical compounds with aliphatic polyhydric alcohols are good binders and produce manufactured articles of novel and useful properties. Chief among these properties is their resistance to heat applied during use.

Many varieties of the common laminated mica plate of commerce, being bonded with an organic adhesive, show excellent desired properties such as electrical resistance and mechanical strength, in temperature ranges below about 300° C. But at higher temperatures the binder is subject to thermal decomposition, causing delamination and destruction of the mica article.

More recently, a new and important series of inorganic adhesives for mica has been developed (Dawes and Boughton, #1,578,812, #1,578,813; Boughton, #1,975,078, #1,975,079; and others), by means of which mica products have been made having superior properties, especially in the higher temperature ranges, up to the decomposition temperature of mica itself. At lower temperatures the water present in the patented compositions necessarily combined colloidally with the inorganic substance (by means of which an adhesive molecular structure is obtained) may prevent the attainment of a desirable degree of electrical resistance, and also in some instances may even cause undesired and undue hygroscopicity.

It is essential to the present invention to state that one important class of these inorganic adhesives included the metaphosphoric acid radical compounds, such as for example, sodium metaphosphate.

The experiments on the new resinous materials prepared by reaction of phosphoric acid radical compounds with a polyhydric alcohol were inaugurated in the hope of discovering reaction products that would prove to have the good properties of an organic mica binder at the lower temperatures; and at higher temperatures, at which any organic material would necessarily be subject to thermal destruction, the inorganic phosphoric acid radical part of the molecule would then function to act as binder, and maintain integration of the mica product through the maximum temperature ranges at which mica itself can be employed.

The results obtained showed that this actually was the case, and that mica articles bonded with the resinous adhesives showed the required properties over the entire temperature range from normal to approximately the decomposition temperature of mica itself.

The adhesive is applied preferably in solution, such as in alcohol. The solid or its solution may, however, be used according to any standard method known in the art. Subsequently, the green plate of desired thickness is rolled, pressed, heated under the usual pressure and finished just as in the known processes of making mica plate with organic binder. The products closely resemble those obtained when organic binders are used. They do not change below about 300° C., when made at this temperature. Above about 300° C.–350° C., the inorganic portion of the molecule takes up the whole bonding burden.

Regarding the bonding materials themselves, we have discovered that by reacting various phosphoric acid compouds with polyhydric alcohols, such as glycerol and ethylene glycol, solid resinous products or highly viscous fluids are formed, they are highly viscous to glass-like in the final stages of the reaction, and are excellent adhesives and bonding agents for different kinds of discrete particles of matter, such, for example, as mica films or pieces. These bonding agents, not only function as such in the lower temperature ranges (below about 200° C.) but also at intermediate and elevated temperatures (up to about 700° C.), for when the organic portion of the molecule has been thermally destroyed, the inorganic residue is capable of exerting a strong bonding effect because of its high viscous colloidal nature at the higher temperatures.

The reactions may be carried on by mixing and heating the stirred materials in an open or closed vessel under ordinary pressure, and the resulting reacted products are colloidal, clear to yellow, and slightly to heavily viscous, or hard, resinous materials. Because of the unusual mechanical and chemical difficulties of dealing with such highly viscous colloidal fluids in the laboratory, no proof of their chemical nature can be offered at this time, but they are believed to be ester-like derivatives of the phosphoric acid compounds formed by successive dehydration of the ortho- and pyro-forms, according (in one variety) to the following changes—

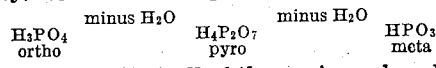

$$H_3PO_4 \text{ (ortho)} \xrightarrow{\text{minus } H_2O} H_4P_2O_7 \text{ (pyro)} \xrightarrow{\text{minus } H_2O} HPO_3 \text{ (meta)}$$

It is believed that all of the various phosphoric acid compounds reacted with glycerol as described below enter into this scheme in one stage or another to form finally the metaphosphoric acid compound.

The orthophosphoric acid compounds apparently do not react as such but only dissolve in lower concentrations to form the viscous glycerophosphates of commerce, although solution of larger proportions of inorganic constituent may not take place until the temperature is elevated enough to form the metaphosphoric grouping.

The reaction we employ takes place only at these higher temperatures, and in this our products are distinguished from the so-called glycerophosphates of commerce.

The conditions of the reaction and the characteristics of the reaction products depend on (1) the particular inorganic compound used; (2) the polyhydric alcohol used; (3) the proportions employed; and (4) the temperature. The last condition, that of temperature, is limited by the fact that solubility of some of the phosphoric acid compounds in polyhydric alcohols may be low or nil. Reaction appears to take place only when there is solubility, and this has been found always to exist at temperatures beginning at about 175° C. and upwards, generally in the neighborhood of 180° C.–200° C. Solution of the inorganic reactant at this temperature is accompanied by rapid evolution of water chemically combined, or formed as a result of the reaction, or both. The final products are colloidal, usually hard, resinous, and soluble in water. They are adhesives and bonding agents of importance for many kinds of discrete particles, such as mica flakes or pieces. With increasing temperatures they show flexibility and partly irreversible thermoplasticity below about 125° C.; they become stiff after being heated to 180° C.–315° C., and above about 300° C.–350° C. the organic part of the molecule is lost by decomposition and the inorganic residue assumes the whole bonding burden, usually fusing to a vitreous adhesive at 400° C.–650° C.

Details of the preparations and properties now follow—

TABLE 1

*Products of reaction between 100 grams of glycerol and various amounts of metaphosphoric acid*

| Amount of $HPO_3$, grams | 190° C. | 200° C. | 210° C. | 220° C. |
|---|---|---|---|---|
| 50 | Clear. Colorless. Viscous. | Clear. Colorless. Viscous. | Clear. Colorless. Heavily viscous. | Clear. Yellow. Semi-solid. |
| 75 | Clear. Colorless. Heavily viscous. | Clear. Colorless. Heavily viscous. | Clear. Colorless. Semi-solid. | Clear. Colorless. Semi-solid. |
| 100 | Clear. Colorless. Semi-solid. | Clear. Colorless. Almost solid. | Clear. Colorless. Almost solid. | Clear. Colorless. Soft solid. |
| 150 | Clear. Colorless. Semi-solid. | Clear. Colorless. Almost solid. | Clear. Colorless. Sl. soft solid. | Clear. Yellow. Hard resin. |

The optimum conditions are obviously the use of three parts of inorganic compounds to two of glycerol, and rapid heating to 220° C. The same result is obtained by slower heating to as low as about 180° C. for a longer time.

TABLE 2

*Summary of optimum conditions for reaction of phosphoric acid compounds with 100 grams of glycerol*

| Phosphoric acid compound | Amount grams | Temperature centigrade, degrees | Product |
|---|---|---|---|
| Metaphosphoric acid | 75–100 | 200–220 | Clear to yellow, heavily viscous. |
| | 150 | 180–220 | Clear to yellow, heavily viscous to solid. |
| Orthophosphoric acid | 400–800 | 180–200 | Clear, brown, heavily viscous. |
| Mono ammonium phosphate | 100 | 210–220 | Clear, colorless to yellowish, heavily viscous. |
| | 200–300 | 200–220 | Clear, colorless to yellow-brown, heavily viscous to semi-solid. |
| Mono calcium phosphate | 100 | 200–220 | Creamy, light to dark brown, heavily viscous to semi-solid. |
| | 200 | 180–200 | Colorless to dark brown, soft to almost solid. |
| Mono potassium phosphate | 100 | 200–240 | Cloudy to clear, colorless to yellow, heavily viscous to hard. |
| | 150–200 | 180–240 | Cloudy to clear, colorless to yellow, heavily viscous to very hard. |
| Mono sodium phosphate | 50 | 210–240 | Clear, colorless to yellow, heavily viscous. |
| | 100–200 | 200–240 | Clear to opaque, colorless to yellowish, heavily viscous to hard. |
| Diammonium phosphate | 100–200 | 180–205 | Clear, colorless to brown, viscous to semi-solid. |
| Sodium ammonium phosphate | 100 | 200–210 | Clear, colorless to yellow, heavily viscous to semi-solid. |
| | 200 | 200–210 | Clear, yellow to brown, semi-solid to hard. |
| *With 100 grams of ethylene glycol instead of glycerol* | | | |
| Metaphosphoric acid | 150 | 190–220 | Clear to opaque, yellow to brown, semi-solid to almost solid. |
| Sodium metaphosphate | 75+ 200 g. water. | 180–205 | Clear to opaque, colorless to cream, hard resin. |
| Mono sodium phosphate | 100 | 180–220 | Clear to cloudy, colorless, hard resin. |

The phosphate salts mentioned above are all derivatives of orthophosphoric acid, unless otherwise specified.

The reactive orthophosphates appear to be limited to monobasic alkali metal salts, the only reacting di- or tri-basic compound found being the ammonium salt which is known to decompose to the monobasic salt on being heated. This limitation may be explained by the assumption that since monobasic alkali metal orthophosphates are known to be decomposed by heat to form the corresponding metaphosphates, the reaction is one between the polyhydric alcohol and a metaphosphate,—and this assumption is justified by a study of the reaction between the alcohols and sodium metaphosphate, or metaphosphoric acid.

We claim:—

1. A built-up mica product containing mica flakes, said mica flakes bonded in said product with the colloidal viscous resinous reaction product of a polyhydric alcohol and a phosphoric acid compound.

2. A built-up mica product containing mica flakes, said mica flakes bonded in said product with the colloidal viscous resinous reaction product of a polyhydric alcohol and an alkali metal orthophosphate.

3. A built up mica product containing mica flakes, said mica flakes bonded in said product with the colloidal viscous resinous reaction product of a polyhydric alcohol and a metaphosphoric acid compound.

4. A built-up mica product containing mica flakes, said mica flakes bonded in said product with the colloidal viscous resinous reaction product of a polyhydric alcohol and an alkali metal metaphosphate.

5. A built-up mica product containing mica flakes, said mica flakes bonded in said product with the colloidal viscous resinous reaction product of a polyhydric alcohol and sodium metaphosphate.

6. A built-up mica product containing mica flakes, said mica flakes bonded in said product with the colloidal viscous resinous reaction product of a mixture of polyhydric alcohols and alkali metal metaphosphate.

7. A built-up mica product containing mica flakes, said mica flakes bonded in said product with the colloidal viscous resinous reaction product of a mixture of polyhydric alcohols and sodium metaphosphate.

8. A built-up mica product containing mica flakes, said mica flakes bonded in said product with the colloidal viscous resinous reaction product of glycerol and a phosphoric acid compound.

9. A built-up mica product containing mica flakes, said mica flakes bonded in said product with the colloidal viscous resinous reaction product of glycerol and an alkali metal orthophosphate 10. A built-up mica product containing mica flakes, said mica flakes bonded in said product with the colloidal viscous resinous reaction product of glycerol and a metaphosphoric acid compound.

11. A built-up mica product containing mica flakes, said mica flakes bonded in said product with the colloidal viscous resinous reaction product of glycerol and an alkali metal metaphosphate.

12. A built-up mica product containing mica flakes, said mica flakes bonded in said product with the colloidal viscous resinous reaction product of glycerol and sodium metaphosphate.

13. A built-up mica product containing mica flakes, said mica flakes bonded in said product with the colloidal viscous resinous reaction product of ethylene glycol and a phosphoric acid compound.

14. A built-up mica product containing mica flakes, said mica flakes bonded in said product with the colloidal viscous resinous reaction product of ethylene glycol and a metaphosphoric acid compound.

15. A built-up mica product containing mica flakes, said mica flakes bonded in said product with the colloidal viscous resinous reaction product of ethylene glycol and an alkali metal metaphosphate.

16. A built-up mica product containing mica flakes, said mica flakes bonded in said product with the colloidal viscous resinous reaction product of ethylene glycol and sodium metaphosphate.

17. A built-up mica product consisting of mica flakes bonded with the mono-acid-radical reaction product of a polyhydric alcohol and a phosphoric-acid-radical compound, said mica product remaining bonded and possessing high electrical resistance over a temperature range from ordinary temperatures to upwards of 650° C. and higher.

WILLIS A. BOUGHTON.
WILLIAM R. MANSFIELD.